United States Patent
Lee et al.

(10) Patent No.: US 12,085,447 B2
(45) Date of Patent: Sep. 10, 2024

(54) SPECTROSCOPY SYSTEM

(71) Applicant: AGENCY FOR DEFENSE DEVELOPMENT, Daejeon (KR)

(72) Inventors: Jae Hwan Lee, Daejeon (KR); Young Soo Chung, Daejeon (KR); Hyung Bin Son, Seoul (KR); Se Kyu Shim, Seoul (KR); Jung Taek Hong, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/939,334

(22) Filed: Sep. 7, 2022

(65) Prior Publication Data

US 2023/0358611 A1 Nov. 9, 2023

(30) Foreign Application Priority Data

May 3, 2022 (KR) .......................... 10-2022-0054713

(51) Int. Cl.
*G01J 3/44* (2006.01)
*G01J 3/02* (2006.01)
*G01J 3/18* (2006.01)
*G01N 21/65* (2006.01)

(52) U.S. Cl.
CPC ........... *G01J 3/4412* (2013.01); *G01J 3/0208* (2013.01); *G01J 3/18* (2013.01); *G01N 21/65* (2013.01)

(58) Field of Classification Search
None
See application file for complete search history.

(56) References Cited

U.S. PATENT DOCUMENTS

| | | | | |
|---|---|---|---|---|
| 7,157,711 B1 * | 1/2007 | Russell | ...................... | G01J 3/06 250/353 |
| 7,385,692 B1 * | 6/2008 | Nguyen | ................... | G01J 3/28 356/301 |
| 2004/0057049 A1 * | 3/2004 | Bruch | ................... | G01J 3/0256 356/334 |

(Continued)

FOREIGN PATENT DOCUMENTS

| | | |
|---|---|---|
| JP | 3651755 B | 3/2005 |
| JP | 2021063683 A | 4/2021 |
| KR | 101668080 B1 | 10/2016 |

OTHER PUBLICATIONS

Ha, Yeon Chul, et al. "Development of an ultraviolet Raman spectrometer for standoff detection of chemicals." Current Optics and Photonics 1.3 (2017): 247-251 (Year: 2017).*

(Continued)

*Primary Examiner* — Uzma Alam
*Assistant Examiner* — Roberto Fabian, Jr.
(74) *Attorney, Agent, or Firm* — Quarles & Brady LLP (57) ABSTRACT

A spectroscopy system that includes a light source that generates light having a plurality of wavelengths, a light transmitter that transmits the light to a target analyte, a light receiver that receives Raman-scattered light scattered from the target analyte, and a multi-wavelength spectroscopy assembly that acquires a spectrum by splitting the Raman-scattered light transmitted from the light receiver. The multi-wavelength spectroscopy assembly includes a single diffraction grating configured to diffract the Raman-scattered light and a single concave mirror configured to focus the Raman-scattered light.

13 Claims, 7 Drawing Sheets

(56) References Cited

U.S. PATENT DOCUMENTS

2011/0273707 A1* 11/2011 Labrecque ............ G01J 3/2846
29/428

OTHER PUBLICATIONS

Kim, Jae-Ihn, et al. "Compact, wavelength-selectable, energy-ratio variable Nd: YAG laser at mid-ultraviolet for chemical warfare agent detection." Current Optics and Photonics 3.3 (2019): 243-247 (Year: 2019).*

Lee, J. H., et al., Non-contact sensor for detecting chemical on ground using dual wavelength Raman spectroscopy, the 2021 Symposium of the Korean Society of Chemical, Biological & Radiological Defense, Nov. 25, 2021 (4 pages).

* cited by examiner

SPECTROSCOPY SYSTEM

CROSS REFERENCE TO RELATED APPLICATION

This application claims the benefit of and priority to Korean Patent Application No. 10-2022-0054713, filed on May 3, 2022, the contents of which is incorporated herein by reference in its entirety.

REFERENCE REGARDING FEDERALLY SPONSORED RESEARCH OR DEVELOPMENT

Not applicable.

SEQUENCE LISTING

Not applicable.

BACKGROUND

1. Field of the Invention

The present disclosure provides a spectroscopy system, and more specifically, a Raman spectroscopy system.

2. Description of the Background

A Raman spectroscopy system is a kind of spectroscopic system which analyzes an analyte using Raman spectroscopy. A multi-wavelength Raman spectroscopy system may be used to identify an analyte distributed on the surface of the earth or an analyte that exists a long distance away.

A chemical analyte detection method using a conventional single-wavelength Raman spectrometer may not obtain a Raman scattering signal, depending on the type of the chemical analyte. This is because, for some chemicals, whether a Raman scattering signal is generated depends on the wavelength of excitation light.

Also, the conventional Raman spectrometer is mainly designed to be installed in a static installation space such as a laboratory, so when it is mounted in a place where there is a lot of vibration, such as a vehicle, failures are common, and thus the useful life of the spectrometer may be shortened.

As an example of the prior art, U.S. Pat. No. 11,175,232 describes a Raman sensor, which is incorporated herein by reference.

SUMMARY

Embodiments of the present disclosure generally relate to a spectroscopy system that may detect and analyze a component of a target analyte located on the earth's surface or at a long distance away using a Raman spectroscopy system. In some embodiments, the spectroscopy system may enhance an accuracy and a probability of a detection of the target analyte by using light having a plurality of wavelengths. In some embodiments, the spectroscopy system may have a compact optical alignment by including a multi-wavelength spectroscopy assembly having a single diffraction grating and a single concave mirror.

In some embodiments, the present disclosure provides a spectroscopy system that can include a light source that can be configured to generate light having a plurality of wavelengths, a light transmitter that can be configured to transmit the light to a target analyte, a light receiver that can be configured to receive Raman-scattered light scattered from the target analyte, and a multi-wavelength spectroscopy assembly that can be configured to acquire a spectrum by splitting the Raman-scattered light transmitted from the light receiver. The multi-wavelength spectroscopy assembly can include a single diffraction grating that can be configured to diffract the Raman-scattered light and a single concave mirror that can be configured to focus the Raman-scattered light.

In some embodiments, the spectroscopy system can include a wavelength separator and a light transmitting device. The wavelength separating portion can be disposed between the light receiver and the multi-wavelength spectroscopy assembly and can be configured to separate the Raman-scattered light for each wavelength region. The light transmitting device can be configured to transmit the Raman-scattered light separated by the wavelength separator to the multi-wavelength spectroscopy assembly. In some embodiments, the light transmitting device may be configured to arrange the Raman-scattered light in a line. In some embodiments, the light transmitting device may be configured to arrange the Raman-scattered light at different heights according to wavelength regions.

In some embodiments, the multi-wavelength spectroscopy assembly can include an imager that can be configured to form a spectrum of the Raman-scattered light. In such embodiments, the spectrum of the Raman-scattered light may be spatially separated and imaged in the imager according to wavelength.

In some embodiments, the diffraction grating may include a penetration hole that can be configured to make the Raman-scattered light, which is transmitted from the light transmitting device, pass through. In such embodiments, the Raman-scattered light passing through the penetration hole may be directed to the concave mirror, and the Raman-scattered light reflected from the concave mirror may be directed toward the diffraction grating in a parallel light state. In some embodiments, the Raman-scattered light diffracted from the diffraction grating may be directed to the concave mirror and may pass through the penetration hole in a focused state due to the concave mirror.

In some embodiments, the wavelength separator can include a dichroic mirror, a Raman filter, and a focusing lens. The dichroic mirror can be configured to control a path of Raman-scattered light according to a wavelength region of the Raman-scattered light transmitted from the light receiver. The Raman filter can be configured to remove Rayleigh-scattered light. The focusing lens can be configured to focus the Raman-scattered light.

In some embodiments, the wavelength separator may include a first Raman filter that can be disposed on one side of the dichroic mirror and a second Raman filter that can be disposed on the other side of the dichroic mirror. In such embodiments, the focusing lens can include a first focusing lens that can be configured to focus and transmit Raman-scattered light transmitted from the first Raman filter and a second focusing lens that can be configured to focus and transmit Raman-scattered light transmitted from the second Raman-filter.

Other aspects of the spectroscopy system described herein, including features and advantages thereof, will become apparent to one of ordinary skill in the art upon examination of the figures and detailed description herein. Therefore, all such aspects of the spectroscopy system are intended to be included in the detailed description and this summary.

DETAILED DESCRIPTION

Hereinafter, embodiments will be described in detail with reference to the accompanying drawings. The following description is one of several aspects of the example embodiments, and the following description forms part of the detailed description of the example embodiments. In describing an example embodiment, a detailed description of a well-known function or configuration is omitted in order to clarify the present disclosure.

However, various alterations and modifications may be made to the examples, so the example embodiments are not construed as limited to the disclosure. The examples should be understood to include all changes, equivalents, and replacements within the idea and the technical scope of the disclosure.

In addition, terminologies or words used in this specification and claims are not construed as limited to the general or dictionary meanings and should be construed as the meanings and concepts matching the technical idea of the invention based on the principle that an inventor is able to appropriately define the concepts of the terminologies to describe the inventor's invention in best way.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of the examples, a detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions of the examples may be applicable to the following examples and thus, duplicate descriptions have been omitted for conciseness.

Figure 1:
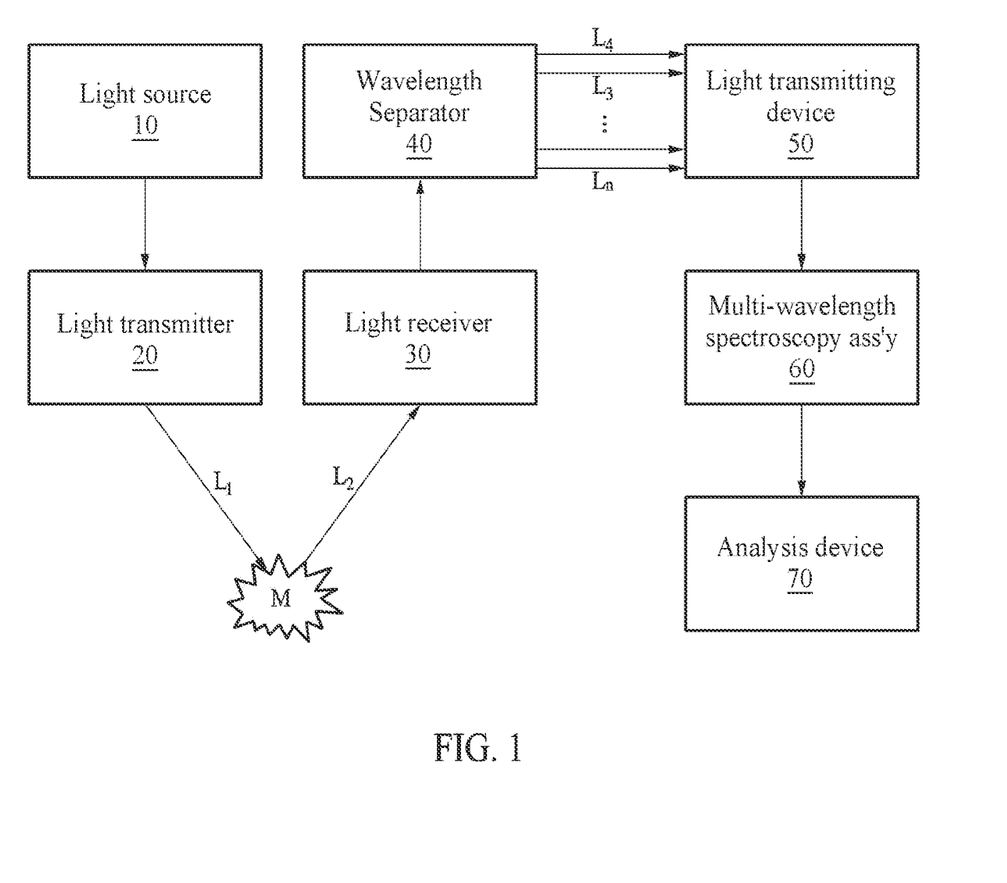
FIG. 1 is a schematic block diagram illustrating a spectroscopy system, according to an embodiment of the disclosure.

Referring now to FIG. 1, shows a schematic block diagram illustrating a spectroscopy system according to an example embodiment. A spectroscopy system may include a light source 10 which may generate light having a plurality of wavelengths, a light transmitter 20 which may transmit a light L1 generated from the light source 10 to a target analyte M, a light receiver 30 which may receive Raman-scattered light L2, i.e., the light scattered from the target analyte M generated by L1 irradiated from the light transmitter 20 to the target analyte M, a wavelength separator 40 which may separate the Raman-scattered light L2 transmitted from the light receiver 30 according to wavelength, a light transmitting device 50 which may transmit light L4, L3, . . . Ln, separated by wavelength region by the wavelength separator 40, to a multi-wavelength spectroscopy assembly 60 for obtaining a spectrum by imaging the light that is separated by wavelength region and transmitted from the light transmitting device 50, to spatially different locations, and an analysis device 70 which analyzes the spectrum obtained by the multi-wavelength spectroscopy assembly 60.

The light L1 generated by the light source 10 may be at least two or more multi-wavelength lasers, and the light source 10 may include a laser light source which generates multi-wavelength laser beams. In this case, the light of a plurality of wavelengths included in the laser may have a harmonic relationship with each other, matching the optical paths of Raman-scattered light of multiple wavelengths using a single diffraction grating. The diffraction grating and the optical path of the Raman-scattered light will be described in detail in the multi-wavelength spectroscopy assembly 60 of FIGS. 4A-4C.

The light transmitter 20 may secure an optical path so that the laser having a plurality of wavelengths produced by the light source 10 may be transmitted to the target analyte M.

When the laser beam reaches the target analyte M, scattered light is generated. The scattered light includes Rayleigh-scattered light having the same wavelength as the incident light and Raman-scattered light generated by the Raman effect. Raman-scattered light has a different wavelength from the incident light because the polarization rate of the material absorbing the light is changed by atomic vibration or rotational motion in the material. The main component of the scattered light is Rayleigh-scattered light, and the Rayleigh-scattered light may interfere with the observation of Raman-scattered light, and thus may need to be removed.

A portion of the scattered light L2 generated by the target analyte M including the Rayleigh-scattered light and the Raman-scattered light may be collected by the light receiver 30.

The scattered light L2 collected by the light receiver 30 may be directed to the wavelength separator 40. The wavelength separator 40 may filter Rayleigh-scattered light among components of the scattered light L2 and separate the Raman-scattered light by wavelength region.

The Raman-scattered light is directed to the light transmitting device 50 in a state in which it is divided into wavelength regions by the wavelength separator 40. The light transmitting device 50 may change the arrangement of the Raman-scattered light so that the Raman-scattered light L4, L3, . . . Ln of a plurality of wavelength regions may be incident on the multi-wavelength spectroscopy assembly 60.

The Raman-scattered light linearly arranged by the light transmitting device 50 is incident on the multi-wavelength spectroscopy assembly 60. The incident Raman-scattered light may be diffracted and separated by the diffraction grating of the multi-wavelength spectroscopy assembly 60 and may be imaged at spatially different locations depending on the wavelength.

Thereafter, the spectrum of the Raman-scattered light imaged on the imaging portion of the multi-wavelength spectroscopy assembly 60 is analyzed by the analysis device 70, thereby detecting the target analyte M and analyzing its component and configuration.

Figure 2:
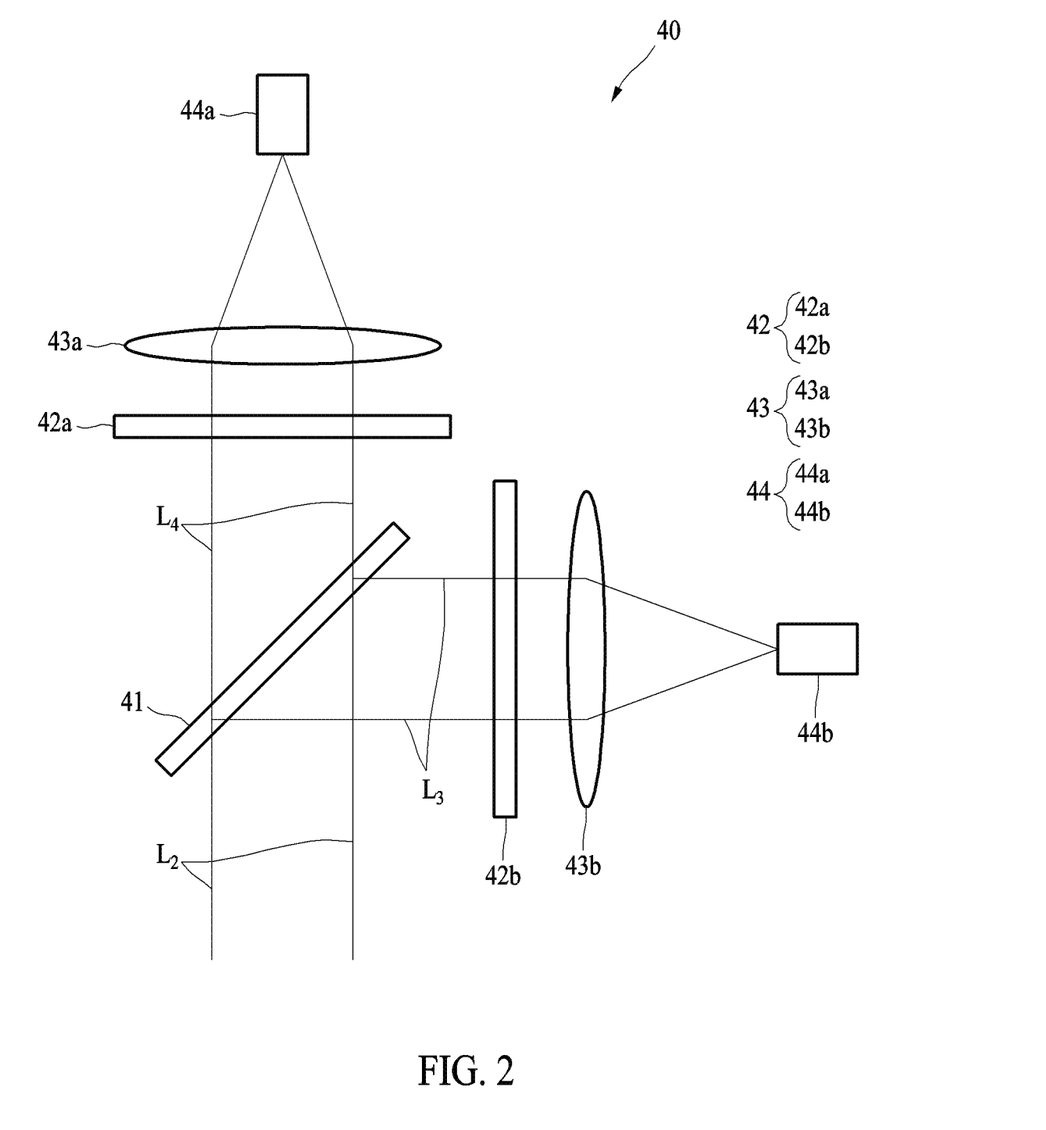
FIG. 2 illustrates a wavelength separator of a spectroscopy system, according to an embodiment of the disclosure.

Referring now to FIG. 2, the wavelength separator 40 of the spectroscopy system is shown, according to an example embodiment. The wavelength separator 40 of the spectroscopy system may include a dichroic mirror 41 which separates the path of scattered light by wavelength region, a Raman filter 42 which filters and removes Rayleigh-scattered light among the scattered light, a focusing lens 43 which focuses the Raman-scattered light transmitted from the Raman filter, and a focusing unit 44 which is connected to light transmitting device 50 which is described below.

As shown in FIG. 2, the scattered light L2 transmitted from the light receiver 30 may be divided and separated into two wavelength regions. In this case, light generated from the light source 10 and irradiated to the target analyte M by the light transmitter 20 may have two wavelengths. However, this is according to an example embodiment for understanding the idea of the present invention, and the wavelength of light generated by the light source 10 of the present invention which is irradiated to the target analyte M is not limited to two wavelengths. That is, two or more wavelengths may be generated and irradiated to the target analyte M, and thus the configuration of the wavelength separator 40 of the present invention is not limited to what is disclosed in FIG. 2 but should be understood as an example case in which two wavelengths are irradiated to the target analyte M.

On this premise, referring again to FIG. 2, the scattered light L2 transmitted from the light receiver 30 may be divided into two wavelength regions. For example, it may be assumed that the wavelengths of the light generated by the light source 10 are 213 nanometers (nm) and 266 nm. In this case, the wavelength range of Raman-scattered light, which is generated when the light of two wavelengths is irradiated to the target analyte M, is about 214 nm to 229 nm for a 213 nm wavelength laser, and 268 nm to 292 nm for a 266 nm laser.

Here, the scattered light L2 incident to the wavelength separator 40 may include not only Raman-scattered light for the light of each wavelength, but also Rayleigh-scattered light for the light of each wavelength. As described above, the Rayleigh-scattered light has the same wavelength as that of the incident light.

The scattered light L2 transmitted from the light receiver 30 may first be divided into two regions by the dichroic mirror 41. For example, Rayleigh-scattered light having a wavelength of 213 nm and the Raman-scattered light L3 having a wavelength of 214 nm to 229 nm are reflected to one side by a dichroic mirror, and Rayleigh-scattered light having a wavelength of 266 nm and the Raman-scattered light L4 having a wavelength of 268 nm to 292 nm may be transmitted through the dichroic mirror.

Thereafter, each separated light passes through the Raman filter 42 so that Rayleigh-scattered light may be removed. Rayleigh-scattered light having a wavelength of 266 nm and Raman-scattered light L4 of 268 nm to 292 nm which passed through the dichroic mirror 41 passes through a first second Raman filter 42a, which is for 266 nm wavelength, and thus the Rayleigh-scattered light of 266 nm is removed and only Raman-scattered light of the 268 nm to 292 nm wavelength region can be extracted. Rayleigh-scattered light of 213 nm and Raman-scattered light L3 of the 214 nm to 229 nm region reflected by the dichroic mirror 41 passes through a second Raman filter 42b, which is for the 213 nm wavelength, and thus Rayleigh-scattered light of 213 nm is removed, and only Raman-scattered light of the 214 nm to 229 nm region can be extracted.

The extracted Raman-scattered light may be focused by the focusing lens 43 and directed to the focusing unit 44. The focusing unit 44 may include an optical fiber bundle for transmitting each focused Raman-scattered light. Raman-scattered light L4 of the 268 nm to 292 nm wavelength region which passed through the first Raman filter 42a for 266 nm wavelength may pass through the first focusing lens 43a for 266 nm wavelength to be focused on the first focusing unit 44a, and Raman-scattered light L3 of the 214 nm to 229 nm wavelength region which passed through the second Raman filter 42b for 213 nm wavelength may pass through the second focusing lens 43b for 213 nm wavelength and may be focused on the second focusing unit 44b. The two focusing lenses 43a and 43b may have different characteristics such as focal length and anti-reflective coating, considering each wavelength region as needed.

Figure 3A:
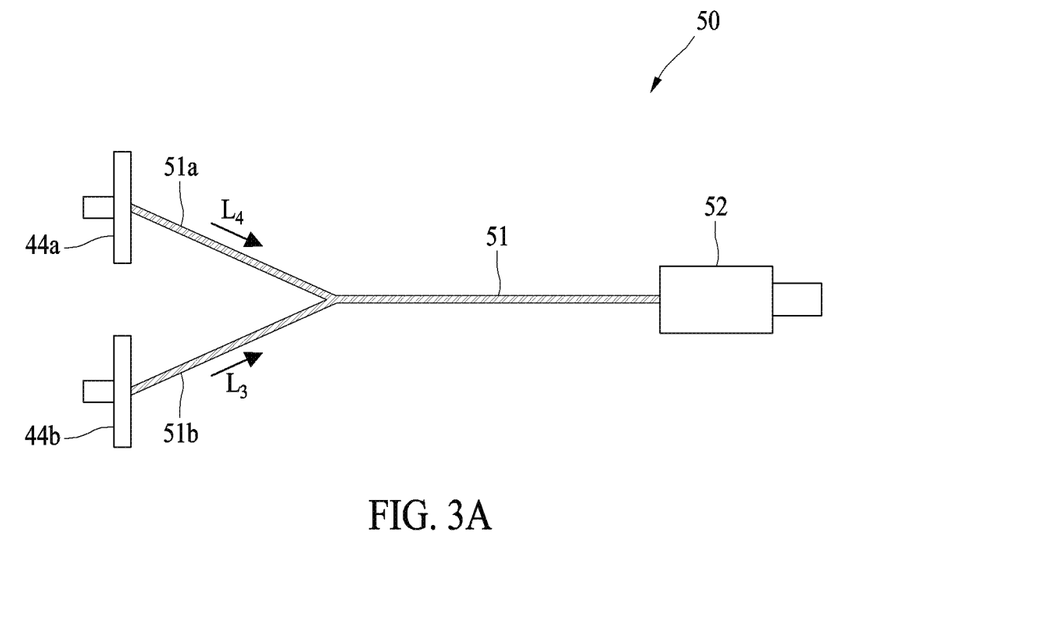
FIGS. 3A and 3B illustrate a light transmitting device of a spectroscopy system, according to an embodiment of the disclosure.
Figure 3B:
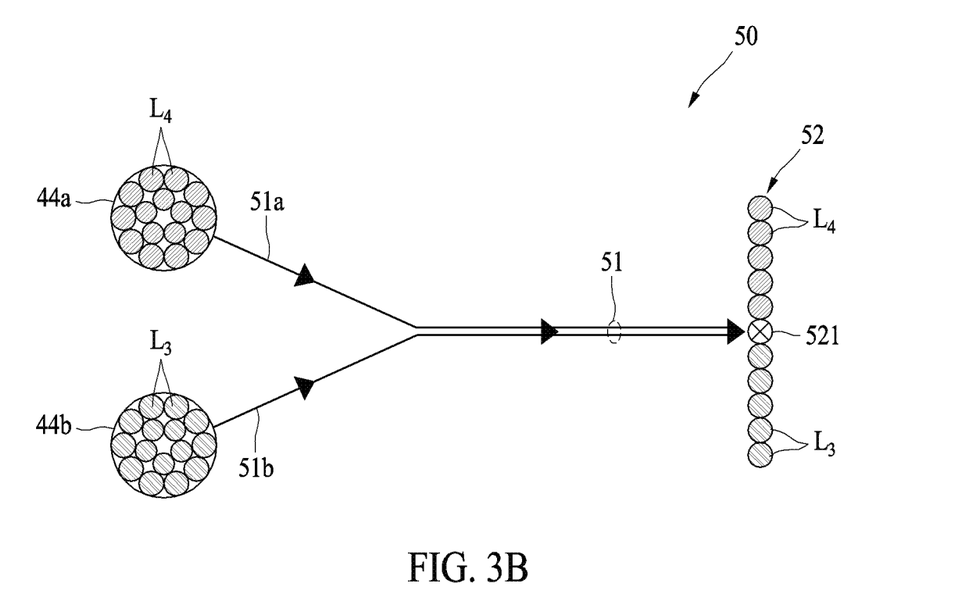

Referring now to FIGS. 3A and 3B, the light transmitting device 50 of a spectroscopy system is shown, according to an example embodiment. Specifically, FIG. 3A shows a schematic diagram of the light transmitting device 50, and FIG. 3B shows a state of arrangement of optical fiber bundles 51 disposed in each configuration of the light transmitting device 50.

Referring specifically to FIG. 3A, the light transmitting device 50 of the spectroscopy system according to an example embodiment may transmit the Raman-scattered light from the focusing units 44a, 44b of the wavelength separator 40 to the multi-wavelength spectroscopy assembly 60, and in the process, the arrangement of the Raman-scattered light may be converted to a linear arrangement.

The light transmitting device 50 may include a transmitting unit 52 for arranging the optical fiber bundle 51 and the optical fiber bundle 51 for transmitting the Raman-scattered light in a predetermined shape to the multi-wavelength spectroscopy assembly 60. The optical fiber bundle 51 may include a first optical fiber bundle 51a communicating with the first focusing unit 44a and a second optical fiber bundle 51b communicating with the second focusing unit 44b. The above-described Raman-scattered light L4 of the 268 nm to 292 nm wavelength region may be delivered to the first optical fiber bundle 51a and the above-described Raman-scattered light L3 of 214 nm to 229 nm wavelength region may be transmitted into the second optical fiber bundle 51b. The first and second optical fiber bundles 51a, 51b extend from the first and second focusing units 44a, 44b, respectively, and may be combined into one optical fiber bundle in the process of reaching the transmitting unit 52. The combined optical fiber bundle 51 may be transmitted to the multi-wavelength spectroscopy assembly 60 through the transmitting unit 52.

Referring specifically to FIG. 3B, the first optical fiber bundle 51a of the first focusing unit 44a and the second optical fiber bundle 51b of the second focusing unit 44b may be bundled together in a circular shape. This may be due to the shape of the Raman-scattered light L4 and L3 focused by the focusing unit being close to a circular shape. Thereafter, the first and second optical fiber bundles 51a, 51b are directed to the transmitting unit 52 in a combined state, and the arrangement of the optical fiber bundles 51a, 51b may be changed to a linear arrangement. Therefore, the arrangement of the optical fiber bundles 51a, 51b in the transmitting unit 52 may be formed in a way that each optical fiber is arranged in a straight line. The shape of the optical fibers arranged in a line may serve the role of a slit limiting the cross-section of the light flux at the entrance of the multi-wavelength spectroscopy assembly 60.

Here, the Raman-scattered light L4 of 268 nm to 292 nm wavelength region and the Raman-scattered light L3 of 214 nm to 229 nm wavelength region may be arranged in a divided state of upper and lower portions in the transmitting unit 52. Therefore, it is possible to obtain a spectrum spatially separated by wavelength in an imager of the multi-wavelength spectroscopy assembly 60, which will be described below.

Also, the transmitting unit 52 may include a separation optical fiber 521 for accurate separation of the optical fiber group of the Raman-scattered light L3 of 214 nm to 229 nm wavelength region in the lower part of the transmitting unit 52 and the Raman-scattered light L4 of 268 nm to 292 nm wavelength region in the upper part of the transmitting unit 52.

It should be understood in advance that the configuration of the light transmitting device 50 shown in FIGS. 3A and 3B is an example case in which two wavelengths are irradiated to the target analyte M as described above.

Figure 4A:
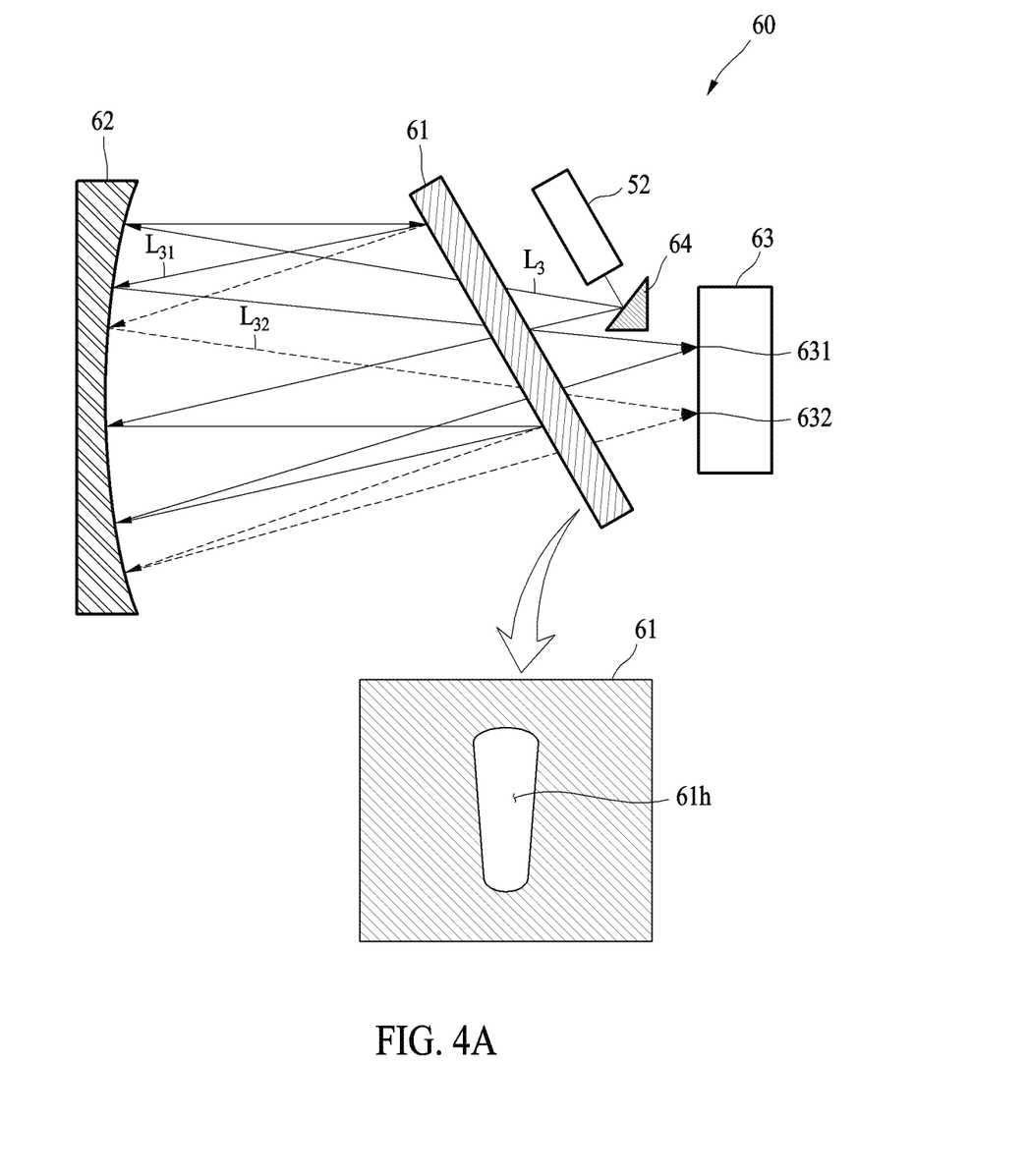
FIGS. 4A-4C illustrate a multi-wavelength spectroscopy assembly of a spectroscopy system, according to an embodiment of the disclosure.
Figure 4B:
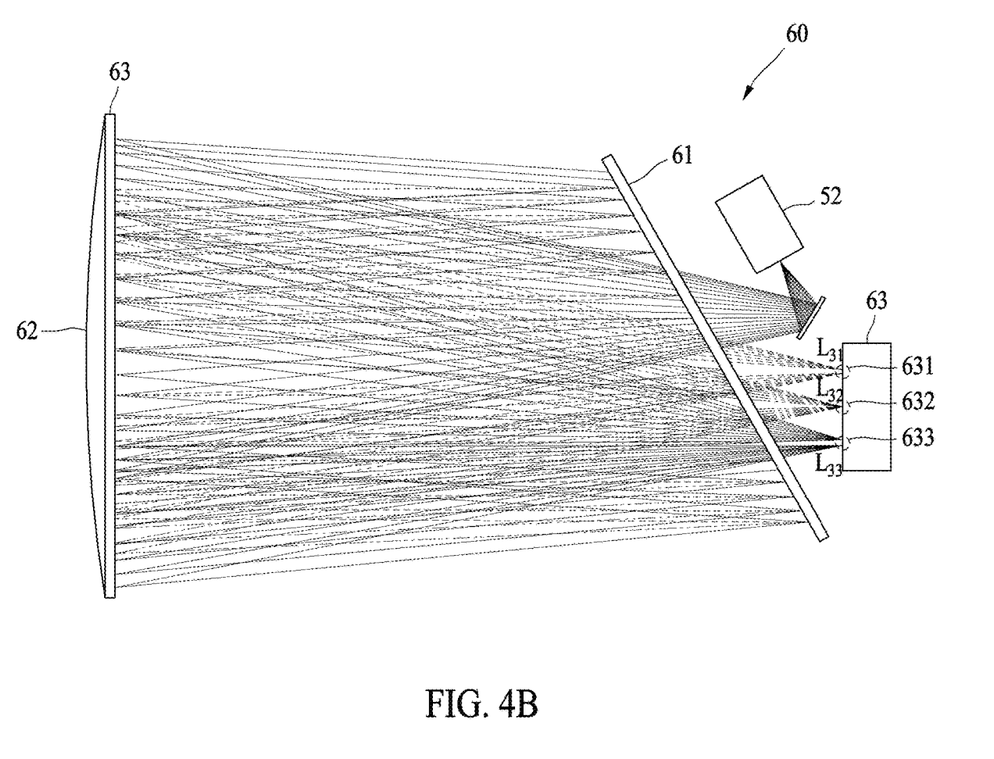
Figure 4C:
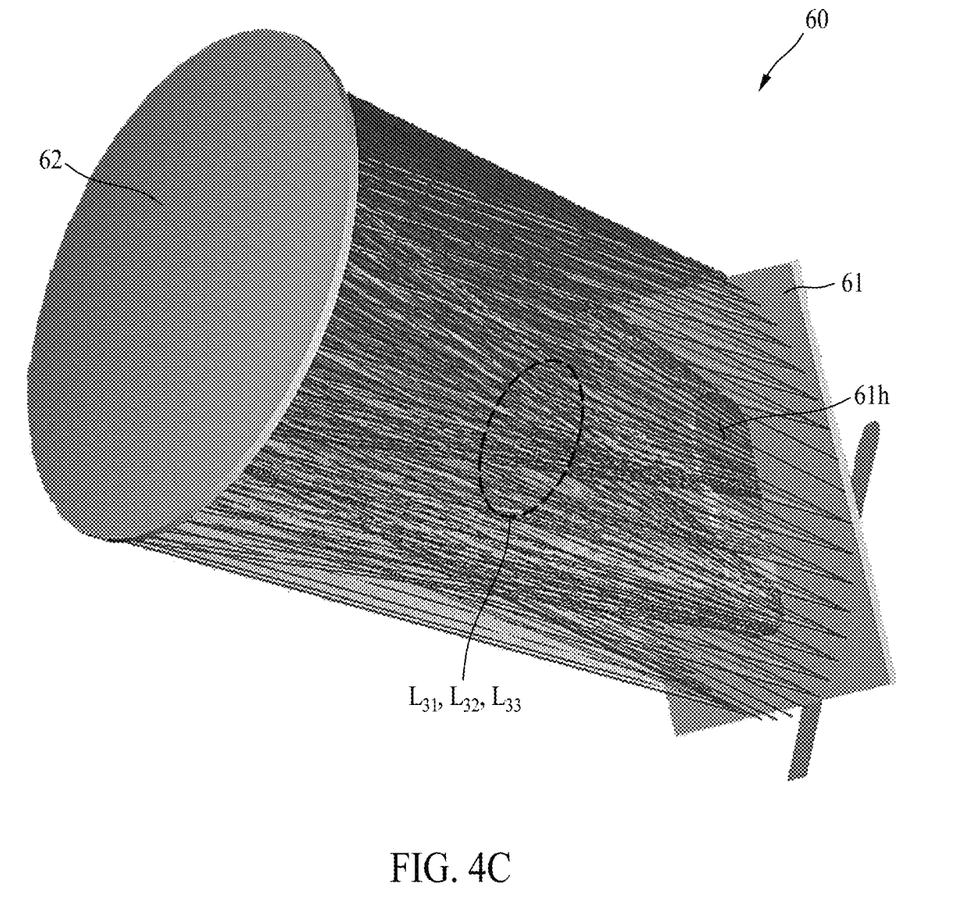

Referring now to FIGS. 4A-4C, the multi-wavelength spectroscopy assembly 60 of the spectroscopy system is shown, according to an example embodiment. Referring specifically to FIG. 4A, a schematic diagram of an optical path of Raman-scattered light of the multi-wavelength spectroscopy assembly 60 is shown. Raman-scattered light of a plurality of wavelength ranges incident from the transmitting unit 52 of the light transmitting device 50 may be reflected by a flat mirror 64 and be directed toward a concave mirror 62. In this case, a diffraction grating 61 which may split Raman-scattered light may be disposed between the flat mirror 64 and the concave mirror 62. A penetration hole 61h through which Raman-scattered light may pass may be formed in the diffraction grating 61. The Raman-scattered light reflected from the flat mirror 64 may pass through the penetration hole 61h in the diffraction grating 61 to be directed to the concave mirror 62.

At this time, the Raman-scattered light may be, for example, the Raman-scattered light of the 214 nm to 229 nm wavelength region or the Raman-scattered light of the 268 nm to 292 nm wavelength region, but in the following drawings (FIGS. 4B and 4C) including FIG. 4A, only the Raman-scattered light L3 of the 214 nm to 229 nm wavelength region is illustrated as an example, for a clearer understanding of the optical path.

The Raman-scattered light reflected by the concave mirror 62 may be directed to the diffraction grating 61 in the form of parallel light, and the Raman-scattered light split (L31 and L32) by the diffraction grating 61 may be directed to the concave mirror 62 again. The split Raman-scattered light is reflected back to the concave mirror 62 and focused, and then it passes through the penetration hole 61h and is imaged (631, 632) on an imager 63 to form a spectrum.

Here, the penetration hole 61h formed in the diffraction grating 61 may be formed to a width becoming narrower from one end to the other end (as shown in FIG. 4A). This may be due to a phenomenon in which the cross-sectional area of the optical path is reduced because the scattered Raman-scattered light directed to the imager 63 is focused by the concave mirror 62.

In addition, as described above, the Raman-scattered light of different wavelength regions may enter the multi-wavelength spectroscopy assembly 60 in a separated state from each other; for example, at the upper and lower portions, by the optical fiber in the transmitting unit 52, and may be imaged to be positioned at the lower and upper portions of the imager 63 in a spatially separated state according to wavelength.

Referring specifically to FIG. 4B, a more detailed optical path of the multi-wavelength spectroscopy assembly 60 for Raman-scattered light of a specific wavelength region (e.g., Raman-scattered light of the 214 nm to 229 nm wavelength region) is shown. The Raman-scattered light of a plurality of wavelength regions may be separated in the imager 63 to be imaged to form a spectrum. Raman-scattered light, which was split in the diffraction grating 61 and reflected twice by the concave mirror 62, passes through the penetration hole 61h of the diffraction grating 61 and is imaged on different locations (e.g., 631, 632, and 633) on the imager 63 to form a spectroscopic spectrum for the corresponding wavelength region.

Referring specifically to FIG. 4C, a three-dimensional view illustrating the optical path of the Raman-scattered light passing through the penetration hole 61h of the diffraction grating 61 of the multi-wavelength spectroscopy assembly 60 is shown. The Raman-scattered light passes through the penetration hole 61h formed in the diffraction grating 61. Accordingly, the penetration hole 61h may be appropriately formed at a predetermined position according to the optical path of the Raman-scattered light so that the Raman-scattered light directed to the imager 63 by the concave mirror 62 is not blocked by the diffraction grating 61. Also, since a loss of luminous flux as much as the area occupied by the penetration hole 61h in the diffraction grating 61 may occur, the penetration hole 61h may be formed in a way that it does not occupy more than the predetermined area with respect to an entire surface area of the diffraction grating 61.

Figure 5:
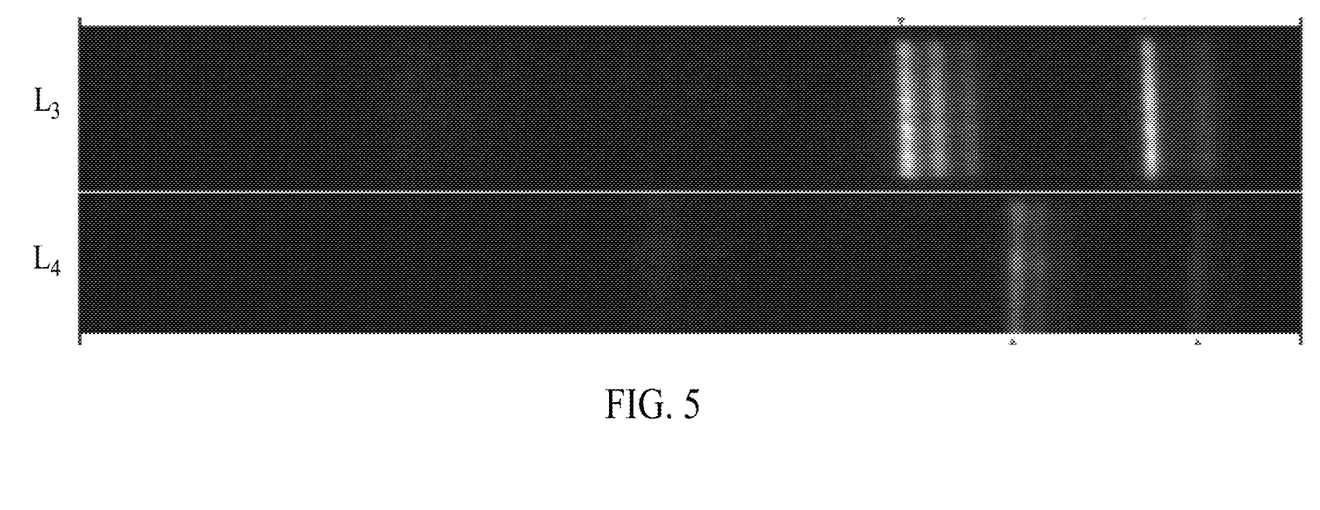
FIG. 5 illustrates Raman-scattered light imaged in an imager in a spectroscopy system, according to an embodiment of the disclosure.

Referring now to FIG. 5, Raman-scattered light imaged in an imager in a spectroscopy system is shown, according to an example embodiment. It can be confirmed that the spectrum of the Raman-scattered light is spatially imaged at different positions according to the wavelength and the wavelength region in the imager 63 of the multi-wavelength spectroscopy assembly 60. For example, the spectroscopic range for region A is 264 centimeters$^{-1}$ (cm$^{-1}$) to 4030 cm$^{-1}$ based on the Raman shift, and the spectroscopic range for region B is 215 cm$^{-1}$ to 3220 cm$^{-1}$, so the spectroscopic range of region A may be wider. Accordingly, it can be confirmed that the spectrum of region A is more densely formed.

As described above, example embodiments have been described with reference to specific matters, such as specific components and limited example embodiments and drawings, but these are provided only to help the overall understanding of the present disclosure. As such, the present disclosure is not limited to the above-described example embodiments, and various modifications and variations are possible from these descriptions by those skilled in the art to which the present disclosure pertains. Accordingly, the scope of the present disclosure is defined not by the detailed description, but by the claims and their equivalents, and all variations within the scope of the claims and their equivalents are to be construed as being included in the disclosure.

We claim:

1. A spectroscopy system, comprising:
a light source that generates light having a plurality of wavelengths;
a light transmitter that transmits the light from the light source to a target analyte;
a light receiver that receives Raman-scattered light scattered from the target analyte;
a multi-wavelength spectroscopy assembly that acquires a spectrum by splitting the Raman-scattered light transmitted by the light receiver, the multi-wavelength spectroscopy assembly including only a single diffraction grating that diffracts the Raman-scattered light and only a single concave mirror that focuses the Raman-scattered light;
a wavelength separator disposed between the light receiver and the multi-wavelength spectroscopy assembly that separates the Raman-scattered light for each wavelength region; and
a light transmitting device that transmits the Raman-scattered light separated by the wavelength separator to the multi-wavelength spectroscopy assembly,
wherein the single diffraction grating of the multi-wavelength spectroscopy assembly includes only a single penetration hole that permits the Raman-scattered light that is transmitted by the light transmitting device to pass through the diffraction grating, and
wherein the penetration hole of the diffraction grating formed to a width becoming narrower from one end to the other end.

2. The spectroscopy system of claim 1, wherein the light transmitting device arranges the Raman-scattered light in a linear state.

3. The spectroscopy system of claim 2, wherein the light transmitting device arranges the Raman-scattered light at different heights according to wavelength regions.

4. The spectroscopy system of claim 3, wherein the multi-wavelength spectroscopy assembly further includes an imager that forms a spectrum of the Raman-scattered light that is reflected back through the penetration hole by the concave mirror, wherein the spectrum of the Raman-scattered light is spatially separated and imaged on the imager according to wavelength.

5. The spectroscopy system of claim 1, wherein the Raman-scattered light passing through the penetration hole is directed to the concave mirror, and the Raman-scattered light reflected by the concave mirror is directed toward the diffraction grating in a parallel state.

6. The spectroscopy system of claim 5, wherein the Raman-scattered light diffracted by the diffraction grating is directed to the concave mirror and passes through the penetration hole in a focused state via the concave mirror.

7. The spectroscopy system of claim 1, wherein the wavelength separator comprises:
a dichroic mirror that controls a path of Raman-scattered light according to a wavelength region of the Raman-scattered light transmitted by the light receiver;
a Raman filter that removes Rayleigh-scattered light; and
a focusing lens that focuses the Raman-scattered light.

8. The spectroscopy system of claim 7, wherein the Raman filter comprises a first Raman filter disposed on one side of the dichroic mirror and a second Raman filter disposed on the other side of the dichroic mirror, and
wherein the focusing lens comprises a first focusing lens that focuses and transmits Raman-scattered light transmitted by the first Raman filter to the light transmitting device and a second focusing lens that focuses and transmits Raman-scattered light transmitted by the second Raman filter to the light transmitting device.

9. The spectroscopy system of claim 1, wherein the plurality of wavelengths generated by the light source have a relationship of harmonic waves.

10. The spectroscopy system of claim 1, wherein the penetration hole of the diffraction grating has a tapered shape having a width that is narrower at one end than the other end.

11. The spectroscopy system of claim 4, wherein the Raman-scattered light passing through the penetration hole is directed to the concave mirror and is reflected and directed toward the diffraction grating by the concave mirror, the Raman-scattered light diffracted by the diffraction grating is directed back to the concave mirror and is reflected back through the penetration hole in a focused state by the concave mirror to the imager.

12. The spectroscopy system of claim 11, wherein the penetration hole of the diffraction grating has a tapered shape having a width that is narrower at one end than the other end.

13. The spectroscopy system of claim 11, wherein the multi-wavelength spectroscopy assembly further includes a flat mirror that reflects and directs the Ramen-scattered light from the light transmitting device through the penetration hole of the grating to the concave mirror.

* * * * *